United States Patent

Sinemus

[11] Patent Number: 5,676,051
[45] Date of Patent: Oct. 14, 1997

[54] HEATED WARMING APPARATUS FOR FOOD PRODUCTS

[75] Inventor: Kai Sinemus, Mainz, Germany

[73] Assignee: Primus Gastronomiebetriebe GmbH, Mainz, Germany

[21] Appl. No.: 605,007

[22] PCT Filed: Jul. 13, 1995

[86] PCT No.: PCT/DE95/00943

§ 371 Date: Apr. 2, 1996

§ 102(e) Date: Apr. 2, 1996

[87] PCT Pub. No.: WO96/02177

PCT Pub. Date: Feb. 1, 1996

[30] Foreign Application Priority Data

Jul. 13, 1994 [DE] Germany .................. 9411346 U
Dec. 2, 1994 [DE] Germany .................. 9419345 U

[51] Int. Cl.⁶ .................. A47J 47/14; A47J 39/00
[52] U.S. Cl. .................. 99/476; 99/448
[58] Field of Search .................. 99/476, 475, 474, 99/473, 448

[56] References Cited

U.S. PATENT DOCUMENTS

| | | | |
|---|---|---|---|
| 4,052,589 | 10/1977 | Wyatt | 99/448 X |
| 4,110,916 | 9/1978 | Bemrose | 99/476 X |
| 4,623,780 | 11/1986 | Shelton | 99/476 X |
| 4,779,524 | 10/1988 | Wade | 99/476 |
| 5,355,781 | 10/1994 | Liston et al. | 99/476 |
| 5,463,940 | 11/1995 | Cataldo | 99/476 |
| 5,505,122 | 4/1996 | Gerrit | 99/476 |

FOREIGN PATENT DOCUMENTS

| | | |
|---|---|---|
| 0 298 063 | 1/1989 | European Pat. Off. . |
| 0 481 352 A1 | 4/1992 | European Pat. Off. . |
| 2 693 616 | 1/1994 | France . |
| 24 31 546 | 1/1976 | Germany . |
| WO92/16137 | 10/1992 | WIPO . |

*Primary Examiner*—Reginald Alexander
*Attorney, Agent, or Firm*—Oliff & Berridge

[57] ABSTRACT

A heated warming apparatus for food products comprises, one or a plurality of food containers, a housing for accomodating the food containers, and a hot-air fan whose discharge opening leads in the housing. Since in such conventional apparatus, the hot air blown from the hot-air fan into the housing flows along the exterior of the food containers which mostly are cardboard containers, the transfer of heat to the food products contained in the containers is poor. In order to maintain a sufficiently high temperature of the food products the hot air has to be heated intensively. The object of the invention is to reduce the required heating power in an apparatus of this type. This object is achieved by providing each food container with one or a plurality of inlet holes and one or a plurality of outlet holes for the hot air, and each food container is arranged in the housing such that at least one of its holes in in fluid communication with the discharge opening.

29 Claims, 8 Drawing Sheets

HEATED WARMING APPARATUS FOR FOOD PRODUCTS

FIELD OF THE INVENTION

The present invention relates to a heated warming apparatus for food products.

BACKGROUND OF THE INVENTION

Such a heated warming apparatus is known from the European Patent Application EP 0 481 352 A1, in which a heat insulating container comprising a lower part and an upper part to be put thereon, accomodates the food products. Said lower part is designed as a functional unit that comprises a heater and a rotor. The rotor serves to circulate the hot air heated by said heater, through the upper part. Said upper part is designed as a delivery bag for the food products and is removed from the lower part for the transport thereof.

If the food products are, for example, pizzas, these are laid immediately after the preparation in a conventionally flat pizza box with a cover. With closed covers, the pizza boxes are then stacked upon each other inside said upper part.

However, since the hot air can only pass along the exterior of the boxes, and said boxes mostly are made of cardboard which is a fairly bad heat conductor, the heat transfer from the hot air to the pizzas is accordingly low. Therefore, to maintain a satisfactory temperature of the pizzas, the air has to be heated intensively. But this requires a high heating power that, especially in case of the transported operation of the warming apparatus, cannot, or only with an exaggerated expense be provided.

SUMMARY OF THE INVENTION

It is therefore an object of the present invention to provide a heated warming apparatus for food products, of the type mentioned at the beginning, which requires less heating power.

Since the hot air heated by the heater does not pass along the exterior of the food containers, but flows through the interior of each food container, the heat carried along with the hot air arrives at the food products that actually are to be heated, directly instead of a detour through the walls of the containers. By that, the air temperature, and thus the heating power and the energy consumption, too, can be reduced.

Advantageously, not only the discharge opening but also the suction opening of the hot-air fan is leading in the housing, and each food container is arranged in said housing such that at least one of its outlet holes is in fluid connection with the suction opening. By this means, a closed flow path is achieved for the hot air in the housing. This path extends from the discharge opening of the hot-air fan to the inlet holes in the food containers, through these holes into the interior of the containers and over the food products, as for example pizzas, from there through the outlet holes in the food containers, and to the suction opening of the hot-air fan. Since the air that leaves the food containers, has been indeed cooled down by transferring the heat to the food products, but its temperature is still higher than the ambient temperature existing exterior the housing, the hot-air fan needs not to warm up the cold ambient air, so that additional energy can be saved.

By means of a temperature- and/or humidity-sensor inside the hot-air fan, and of a control unit for controlling said hot-air fan in accordance with the signals of said temperature- and/or humidity-sensor, the climatic conditions inside the hosing can easily be controlled.

Next, two alternative preferred embodiments of the heated warming apparatus according to the invention will be presented, which are based on different courses of the hot-air flow. In the first alternative, the single flow paths through each food container are arranged in series, whereas in the second alternative, they are arranged in parallel.

The features of the first alternative embodiment are described. Accordingly, the hot air is guided successively through the single food containers stacked on each other. This arrangement makes it possible to keep the food products hot irrespective of the number of food containers contained in the housing, because the hot air is, so to speak passed on from one food container to the food container above it.

Preferably, each food container only comprises a single inlet hole and a single outlet hole, which are arranged as staggered with respect to each other. By this staggered arrangement of the inlet and outlet holes in the bottoms and covers of the food containers stacked according to the invention, the hot air is guided meander-like over the food products thus achieving a more even and effective heating of the food products.

If in each pair of food containers stacked on each other, the upper food container forms the cover of the lower food container, it can be dispensed with separate covers for the single food containers, thus saving material and reducing the use of labor for producing the food containers. An empty food container may serve as the cover for the uppermost of those food containers containing a food product.

In case that each food container has a square ground area, and that the inlet hole is located in one corner of said square, said food containers may be set on each other with alternatively turning them about the vertical axis by 180°. By this, the outlet hole in the cover of each food container is located in that corner of said square which is diametrically opposed to the inlet hole in the bottom of said food container so that the hot air flows as long as possible over each food product.

Preferably, the hot-air fan comprises an air channel with a rotor and a heater disposed one behind the other inside and air channel, and a dehumidification chamber is provided upstream from said heater in a by-pass of said air channel. The dehumidification chamber is useful especially in the case that the hot-air fan sucks in through its suction opening the air leaving the uppermost food container because the hot air takes up moisture from the food products when flowing over them. Then, the hot air can leave the surplus moisture in the dehumidification chamber, thereby keeping, for example pizzas really crusty.

By means of a pressure sensor disposed inside the air channel between the rotor and the inlet opening, which generates a warning signal if the air pressure, with the rotor running, exceeds a given value, it is possible to supervise whether one of the holes of the food containers is blocked by a cover or bottom of the adjacent food container or by a displaced food product, resulting in an interruption of the hot-air flow.

The features of the second alternative embodiment are described. Since each of the inlet and outlet holes of the food containers is in direct fluid connection with the discharge and the suction opening of the hot-air fan, respectively, the hot air is guided in parallel through the single food containers. This arrangement too, makes it possible to keep the food products hot irrespective of the number of food containers contained in the housing, which is a bag in this alternative.

In order to achieve that as little hot air as possible passes the food containers on the exterior and flows directly, i.e., in a short-circuit manner from the discharge to the suction opening of the hot-air fan, there is, according to the invention, further provided that the bag is made of a flexible material, as for example a fabric of manmade fiber. By that, the bag adopts itself to a large extend to the outer contour of the body defined by the fan housing and the food containers. If food containers of different sizes are to be put into the bag, they are put on top of each other as sorted in order of decreasing size.

Advantageously, a clamping strap is attached to the exterior of the bag, for drawing together the bag around the fan housing and the food containers along a circumferential line that is running essentially orthogonally to a line connecting the suction opening with the discharge opening. By this clamping strap, it is possible to press the food containers against the fan housing and to draw together the bag closely around said outer contour, whereby the desired restricted guidance of the hot air through the food containers is improved.

A particularly compact arrangement with good flow characteristics will arise from the feature that the bag opening is laterally provided at the bag, that the hot-air fan is disposed essentially horizontally inside the bag at the end opposed to the bag opening, and that the food containers are lying on top of each other such that a portion of a backwall, which is situated between the inlet and the outlet hole, of each food container closely fits with the exterior of a front wall of the fan housing, said front-wall extending from the suction opening to the discharge opening of said fan housing.

Preferably, the closing of the bag opening, and the drawing together of the bag are simplified by providing that, further, the lower edge of the bag opening is continued by a closing piece which corresponds to the width of the bag opening and is fixable at several positions on the bag exterior. Namely, this makes it possible to manage both operations with a single movement.

Moreover, the hot-air fan may be attached on a bottom plate covering the bag bottom. This is useful especially when carrying the bag because the plate stabilizes the bag.

Projections provided on the bottom plate in a distance to the two side edges thereof extending from the bag opening to the hot-air fan, prevent a lateral slipping of the food containers.

Preferably, the fan housing is formed such that the suction and the discharge opening of the hot-air fan are directed toward the bag opening. Namely, in this case the hot air is directly discharged toward the food containers, and the air entrance from the bag interior into the fan housing is made easier, since a sucking in of the bag inside is prevented.

Preferably, two contacts for the electric power supply of the hot-air fan are attached to the underside of the fan housing and fixable in two corresponding leadthroughs provided in the bag bottom. This is advantageous especially in the case when the hot-air fan is removable from the bag, because it can be connected safely with the bag by means of said contacts.

Further, there is provided a frame for supporting warming apparatuses of the second alternative that are equipped with said contacts. One of such frames may be, for example placed near the pizza oven, and another frame in the vehicle used to deliver the prepared pizzas, so that the pizzas can be heated, nearly without any interruption, just until they arrive at the customer.

It is further preferred that in at least one pair of contact and counter contact, the contact contains either magnetic or ferromagnetic components, whereas the counter contact contains either magnetic or ferromagnetic components, accordingly, or the contact and the counter contact are magnetically polarized in the opposite direction. By this means, it is, in an easy and safe way possible to hold the bag in the shelf, and to maintain the electric connection between the bag and the shelf.

Since the bag is wider than the food containers contained therein, it does not touch the punched side-walls of the food containers closely. Father, there is left open a sort of distribution channel for the discharged hot air, defined between the punched sidewalls situated near the discharge opening, and the portion of the bag-inside that is facing toward said punched sidewalls. Accordingly, there is, at the side of the suction opening, left open a collecting channel for the air leaving the food containers.

The above mentioned projections are very suitable with such food containers, because the prevention of the lateral slipping of the food container avoids the undesirable plugging of the holes in the sidewalls by the close-lying bag-inside.

When using such food containers, the constitution of the distribution and the collecting channel may be supported by providing that the two side edges of the bottom plate extending from the hot-air fan are projecting upwards, because this means, too, avoids the undesirable plugging of the holes in the sidewalls by the close-lying bag-inside.

Advantageously, such food container is further characterized in that its cover comprises foldable wings at its edges being parallel with the punched sidewalls, said wings, when folded downwardly, covering the holes in said punched sidewalls and, when spread out horizontally leaning against the upper rim of the punched sidewalls so that said holes (80,86) are left open. Thus, in said spread-out position leaving open said holes, the foldable wings hold the bag-inside in distance to said holes. Further, such food container provides, as required, for example at the customer, good passive insulating characteristics even exterior the warming apparatus according to the invention, if said wings are folded downwardly as to cover the holes.

A further food container having the features of claim 39 has, as compared with the before mentioned food containers, a greater useful area because its sidewalls have no holes and therefore can just touch the bag-inside closely. Thus, such food containers may cover the whole bag bottom because there is no need to form lateral distribution and collecting channels.

Further advantageous embodiments are described in the subclaims.

The foregoing and other advantages of the invention will appear in the following detailed description of the preferred embodiments, with respect to the accompanying drawing.

PRESENTLY PREFERRED EMBODIMENT OF THE INVENTION

The heated warming apparatus for food products according to the invention will next be described for square pizza boxes as an example for the food containers. However, this description may be transferred as well to any other food containers.

Referring to FIGS. 1 to 5, the first alternative of a heated warming apparatus for food products according to the invention will be described.

Figure 1:
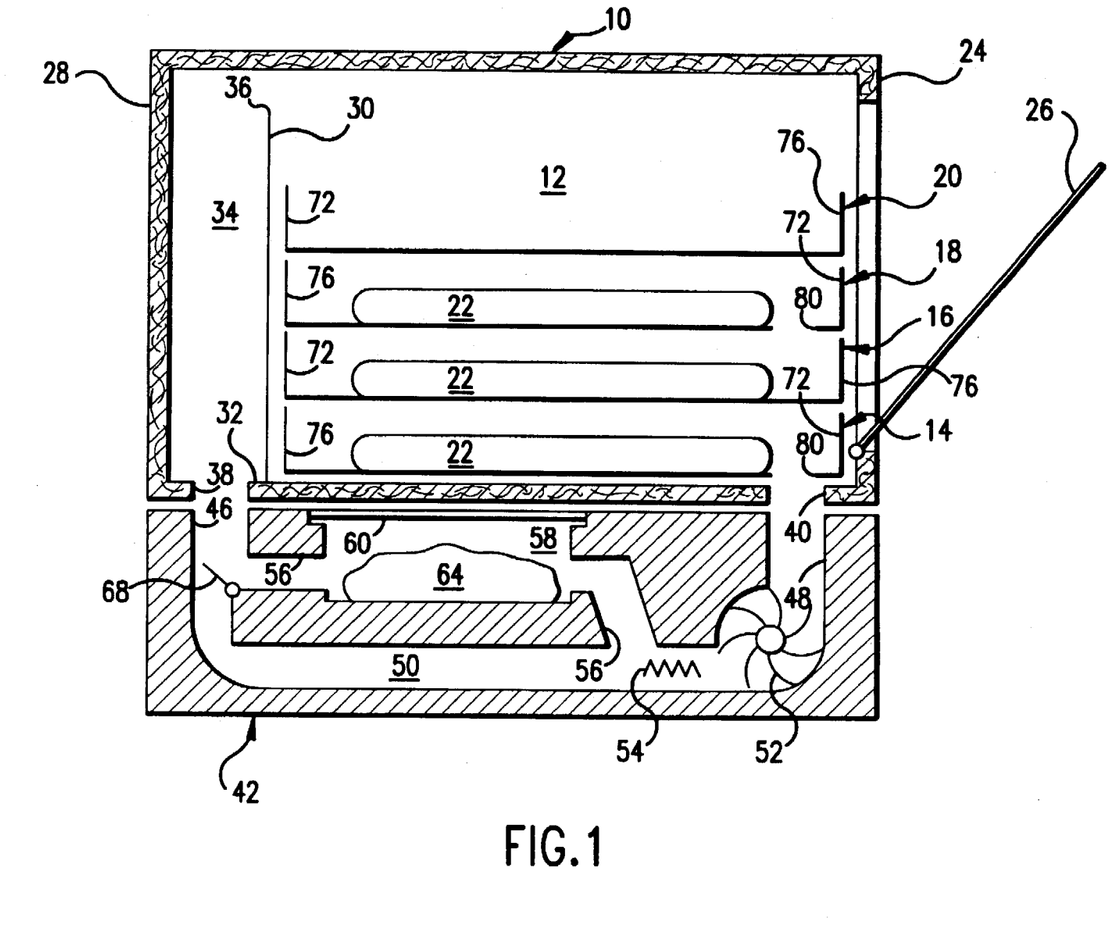
FIG. 1 shows a cross-sectional view of a heated warming apparatus for pizzas, according to the first alternative.

The heated warming apparatus for food products, here pizzas, of FIG. 1 comprises a heat insulated housing 10 with a warming room 12 in it. In this warming room 12, four cardboard boxes 14,16,18,20 with square ground areas are stacked on top of each other as food containers for the pizzas. The ground area of the warming room 12 is also square and somewhat larger than that of the boxes 14–20. Only the three lower boxes 14,16,18 contain a pizza 22, respectively, whereas the uppermost box 20 is empty and serves only as a cover for the uppermost 18 of those boxes 14–18 containing a pizza 22.

In the right wall 24 in FIG. 1, of the housing 10 there is provided a door 26 swinging downward. Parallel with and distant to the left outer wall 28 in FIG. 1, an inner wall 30 extends along the whole width and height thereof, which therefore define between them a drain channel 34 reaching down to the bottom 32 of the housing 10. The inner wall 30 is provided at its top with a connection opening 36 connecting the warming room 12 with the drain channel 34. Further, an outlet opening 38 is provided in a part of the housing bottom 32 that terminates the drain channel 34. On the other side, the housing bottom 32 comprises in its front-right corner, as viewed in FIG. 1, an inlet opening 40.

The housing 10 is detachably held by (not shown) clamps or the like, on a base 42 comprising a hot-air fan. The ceiling of the base 42 is formed with a suction opening 46 and a discharge opening 48 that, when the housing 10 was properly placed, align with said outlet opening 38 and said inlet opening 40, respectively. The suction and the discharge opening 46,48 are connected with each other by an air channel 50 formed in the base 42. The air channel 50 accommodates a rotor 52, which, in operation presses the air through the discharge opening 48 out of the air channel 50, and a heater 54 upstream the rotor 52 for heating the air sucked by the latter.

The heater 54 preferably is a electric heat coil supplied with electricity by a storage battery in the base 42. More preferably, the electric heater 54 is to be connected in parallel to the storage battery, to an external electric power system such as the public mains supply. Further, the storage battery may be replaced by an electric power generator driven by gas, diesel oil or the like.

A by-pass 56 branches directly behind the suction opening 46 off the air channel 50 and runs before the heater 54 back into the air channel 50. The by-pass 56 is expanded in a middle portion to form a dehumifidication chamber 58 that is accessible from the exterior through a hatch 60 in the base ceiling. A net bag 64 filled with a hygroscopic substance such as silica gel (blue gel) is lying in the dehumidification chamber 58.

Attached to the upstream end of the by-pass 56 is a flap 68 that can be swiveled in any desired position whatever, between an end position blocking the by-pass 56 and leaving open the air channel 50, and an end position leaving open the by-pass 56 and blocking the air channel 50, by means of a (not shown) suitable actuator.

A humidity-sensor is provided upstream the flap 68, a temperature sensor downstream the heater 54, and a pressure sensor downstream the rotor 52. These three (not shown) sensors are each connected with a (not shown) control unit for controlling, in accordance with the signals of said sensors the position of the flap 68, the temperature of the heater 54, and the speed of the rotor 52. In addition, the control unit is connected to a warning device such as a LED and/or a source of sound, that is activated if, with the rotor 52 running the air pressure in the air channel 50 exceeds a set value.

The construction of the warming apparatus as separated into the base 42 and the housing 10 to be placed thereon, makes it possible that, for example, a base 42 with mains supply for the electric components placed therein, such as the rotor 52, the heater 54, the actuator for the flap 68, the sensors, and the control unit, stands near the pizza oven, and a further base 42 with own electric power source, such as storage battery or electric generator for the electric base components is mounted in a transport vehicle for delivering the pizza 22 to the customers. This vehicle may be a motorcar, bus as well a motorized two- or three-wheeler, or a bicycle trailer.

To deliver the pizza 22, it is only necessary to shift the housing 10 containing the boxes 14–20 filled with pizzas 22, from the base near the oven to the base of the transport vehicle and to carry the housing 10 to the customer. At the customer, the housing is removed from the base and taken into the apartment of the customer. The pizzas 22 inside the housing 10 are heated and/or dehumidificated both during the stand-by on the base near the pizza oven and during the transport in the vehicle, by means of the hot air produced in the corresponding bases.

Further, it is possible to place a one piece warming apparatus according to the invention, with a larger warming room 12 and mains supply, in which the prepared pizzas 22 in boxes 14–20 are kept hot until their delivery. The boxes are then, depending on demand, placed in respective housings 10 belonging to the above two-piece warming apparatus and having been removed from their bases mounted in transport vehicles.

Figure 2:
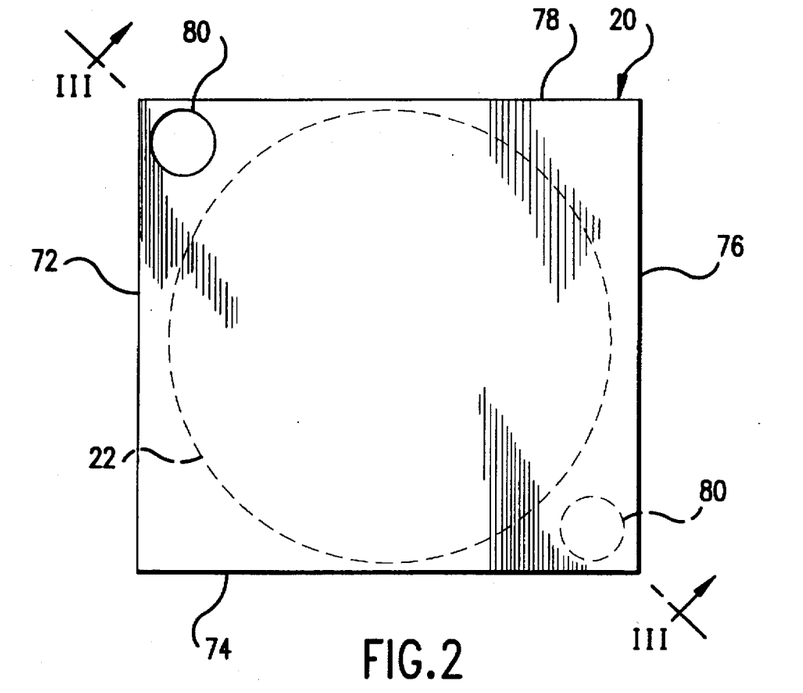
FIG. 2 shows a top view of pizza boxes of a first mode stacked on top of each other.

FIG. 2 is an enlarged top view of the boxes 14°20 stacked on top of each other inside the warming room 12, and FIG.

3 is a section along line III—III in FIG. 2. Each box 14–20 comprises a square bottom 70 and four sidewalls 72,74,76, 78 rising from each edge of said bottom 70, respectively, as shown in FIGS. 2 and 3.

Figure 3:
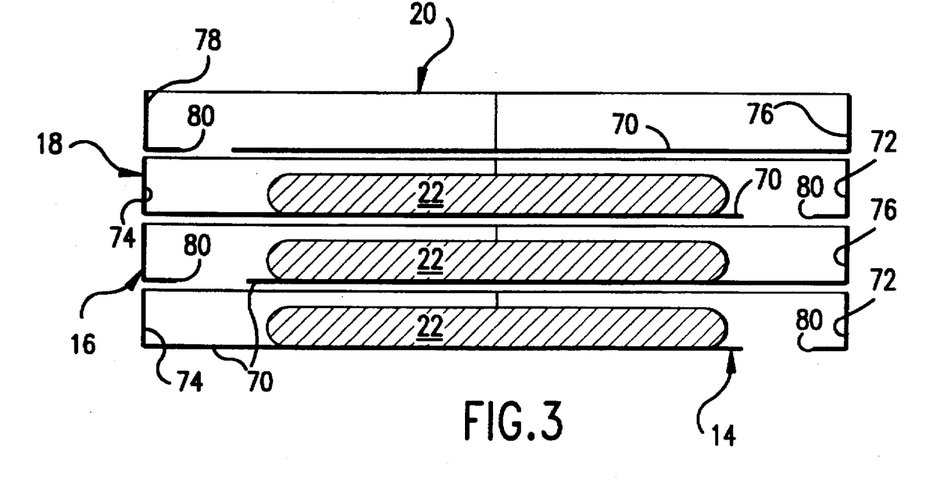
FIG. 3 shows a section along line III—III in FIG. 2.

As shown in FIGS. 2 and 3, each box 14–20 comprises a hole 80 placed in a corner of its bottom 70 so that the hole 80 cannot be covered by the round pizza 22 lying in the box 14–18. As shown in FIG. 3 showing a vertical section of the box stack along a diagonal III—III of the square boxes 14–20, the boxes 14–20 are alternatively turned by 180° about the vertical center line of the box stack so that the holes 80 are not lying upon another as aligned with each other, but are alternately displaced with respect to each other.

The hole 80 of the lowest box 14 is paced, as shown in FIG. 1, exactly over the inlet opening 40 of the housing 10 so that the rotor 52 can blow the hot air through the discharge opening 48 the inlet opening 40, and the hole 80 in the lowest box 14 into the interior thereof. On the way to the hole 80, which lies in the diametrically opposed corner of the box stack and is provided in the second box 16 covering the lowest box 14, the hot air flows over the pizza 22 lying in the lowest box 14, thus keeping the 22 hot. It also absorbs the moisture released by the pizza 22. In the same way, the hot air flows on its meander-like way through the boxes 14 18 forced by the staggered holes 80, the other pizzas 22. The humid and cooled-down air flowing out of the hole 80 (in FIG. 1 not shown) of the uppermost box 20, passes through the connection opening 36 into the drain channel 34 and then through the outlet opening 38 and the suction opening 46 into the air channel 50. A portion of the humid air, the amount of which depending on the position of the flap 68 flows through the dehumidification chamber 58 where it delivers its moisture to the hygroscopic substance. The cool air dehumidificated by this entirely or partially, is heated by the heater 54 and again pressed by the rotor 52 through the boxes 14–20.

To achieve the possibility of controlling from the exterior whether the boxes 14–20 are stacked in the above way, the two opposite sides 72 and 76 of each box 14–20 that, when properly arranging the boxes 14–20 inside the housing 10, face toward and away from the door 26, respectively, are marked differently, for example by the colors green and red. Consequently, with properly arranged boxes 14–20, the side face of the box stack consists of alternating red sidewalls 72 and green sidewalls 76. Thus, even when boxes 14–20 have already been placed in the housing 10, their proper arrangement can be easily and quickly checked with one glance onto the sideface of the box stack facing the door 26, without the need of lifting or unloading them.

Figure 4:
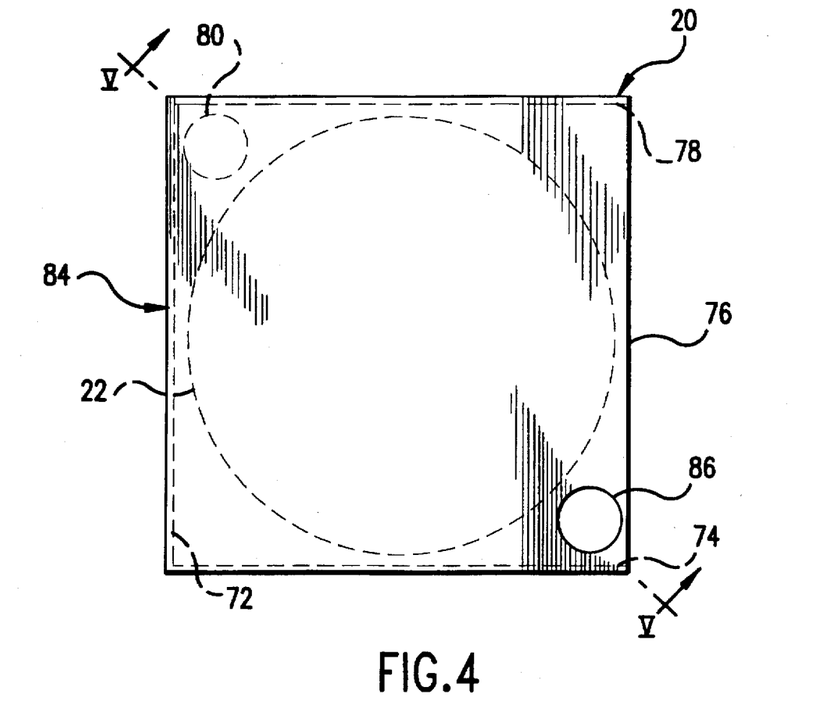
FIG. 4 shows a top view of pizza boxes of a second mode stacked on top of each other.
Figure 5:
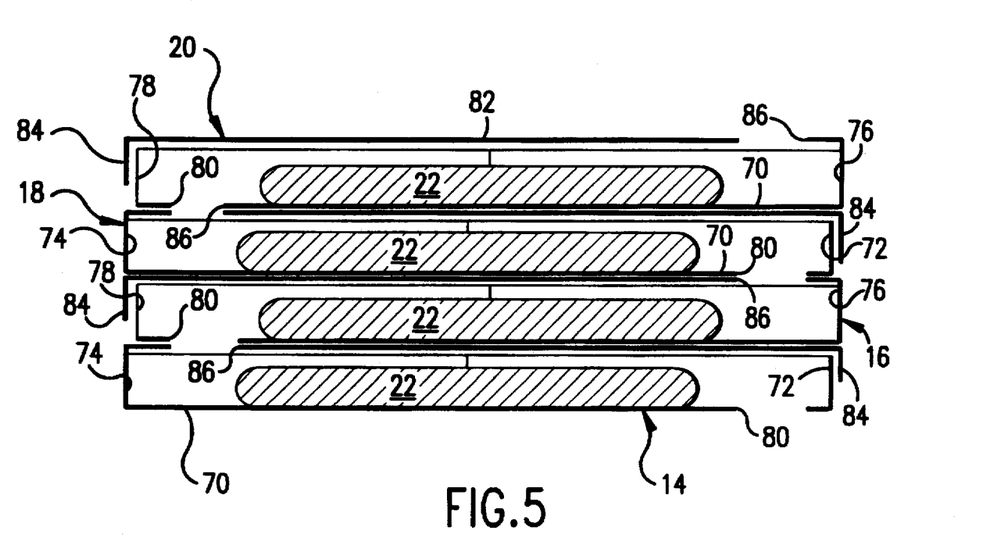
FIG. 5 shows a section along line V—V in FIG. 4.

FIGS. 4 and 5 show a second embodiment of the boxes 14–20. Here, FIG. 4 shows, like FIG. 2, an enlarged top view of the boxes 14–20 stacked on top of each other inside the warming room 12, and FIG. 5, like FIG. 3, is a section along line V—V in FIG. 4.

As shown in FIG. 5 showing a vertical section of the box stack along a diagonal V—V of the square boxes 14–20, each box 14–20 has, in contrast to the fist embodiment shown in FIGS. 1 to 3, an own cover 82 with a square ground area and a lid 84 projecting downward. The lid 84 fits closely with the exteriors of three sidewalls 74,72,78 of the bottom 70, and is, like the bottom 70 formed with a hole 86. In the following, the hole in the bottom 70 will be called inlet hole 80, whereas the hole in the cover 82 will be called outlet hole 86. This cover 82 stabilizes the single box 14–20 and makes it possible to stack the boxes 14–20 on top of each other without any problems, because the bottom 70 of an upper box 16–20 is lying on the entire surface of the cover 82 of the corresponding box 14–18 under it.

As shown in FIG. 5, the outlet hole 86 is located in that corner of the cover 82 which is diametrically opposed to the inlet hole 80 of the same box 14–20. One edge of the cover 82 is fixed swivably to that sidewall 76, which is not covered by the lid 84 so that a relative arrangement of the inlet and the outlet hole 80,86 is given that is diametral when the box 14–20 is closed.

The boxes 14–20 shown in FIG. 5 are alternatively turned by 180° about the vertical such that in each pair of boxes 14,16,16,18,18,20 stacked on top of each other, the inlet hole 80 of each upper box 16;18;20 is aligned with the outlet hole 86 of the corresponding lower box 14;16;18. By this, the meander-like flow path for the hot air, mentioned above with respect to the first embodiment of the boxes shown in FIGS. 1 to 3, is defined with the boxes 14–20 of this second embodiment, too.

The sidewalls 76 of the boxes 14–20 of this second embodiment are marked green, too. However, since the cover lid 84 projecting downward covers the three other sidewalls 74,72,78, it is not the exterior of the sidewall 72 that is marked red, but the exterior of the part of the lid 84 that is adjacent to the sidewall 72. By this, the same color lay-out of the box stack sideface facing the door 26, as in the first embodiment of the boxes, is achieved when properly stacking the boxes 14–20.

With the second embodiment of the boxes, it is, in contrast to the first embodiment, possible to place a pizza 22, represented in FIG. 4 by a dotted line, in the uppermost box 20 because this box 20 does not serve merely as a cover for the third box 18, but is provided for its part with a cover 82 that guides the hot air over the pizza 22 toward the outlet hole 86.

By means of the pressure sensor disposed between the rotor 52 and the discharge opening 48 in the air channel 50, it is possible to check automatically whether the boxes 14–20 are stacked properly. Namely, if for example the lowest box 14 is placed on the housing bottom 32 so that its inlet hole 80 is not aligned with the inlet opening 40, this inlet opening 40 is therefore blocked by the bottom 70 of said box 14. Accordingly, the control unit is able to recognize by means of the excessive air pressure sensed by the pressure sensor, that the boxes 14–20 are stacked improperly.

With references to FIGS. 6 to 14, the second alternative of a heated warming apparatus for food products according to the invention will be described.

Figure 6:
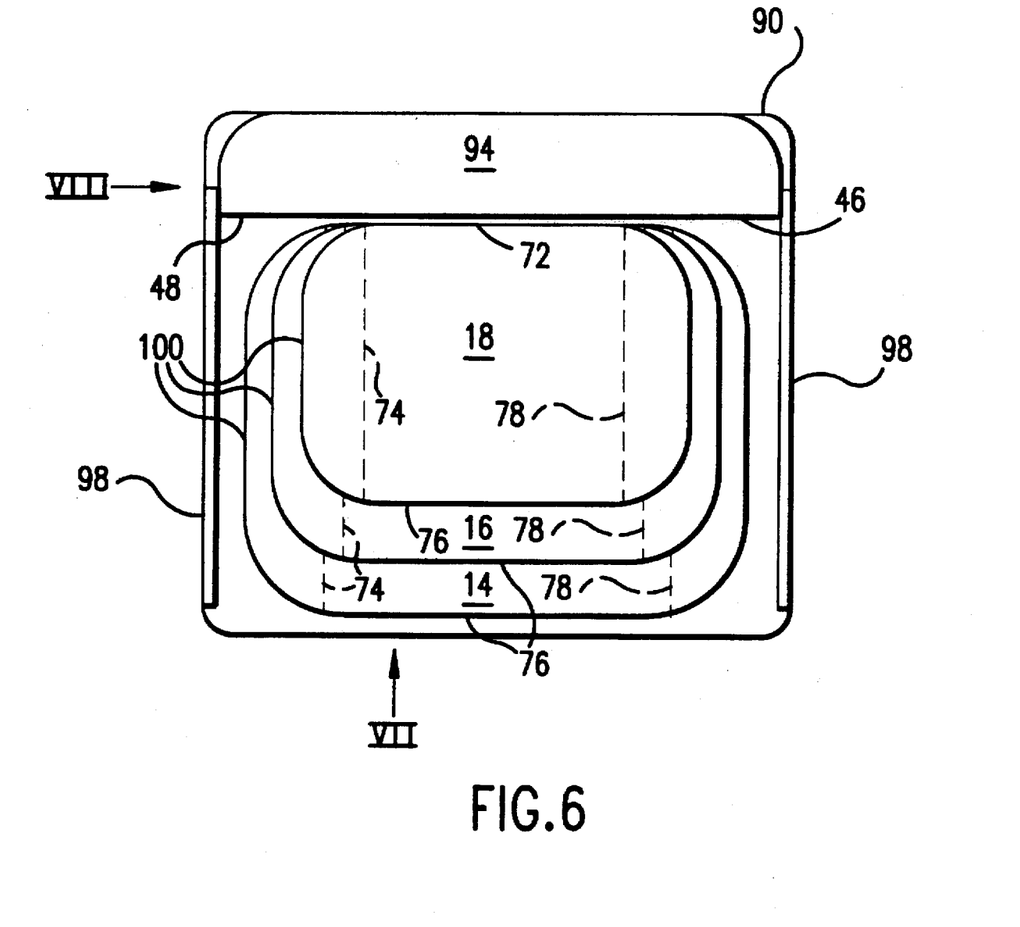
FIG. 6 shows a top view of a hot-air fan attached on a bottom plate and of a stack of pizza boxes of a third mode, as arranged on a closed bag being part of a heated warming apparatus according to the second alternative.

FIGS. 6 to 9 show a third embodiment of the pizza boxes 14,16,18. FIG. 6 shows how three pizza boxes 14–18 are placed one above the other on an essential square bottom plate 90. The shown arrangement corresponds to the position in a bag 92, which is not shown in FIG. 6, but in FIGS. 7 and 8 and has an essential square ground area, too. The bag 92 is open at the lower side as viewed in FIG. 6. At the opposite end, a hot-air fan is fixed on the bottom plate 90 in parallel with said bag opening. The hot-air fan comprises a pipe-shaped fan housing 94 with a square cross section as well as (not shown) a heater and a rotor.

Figure 7:
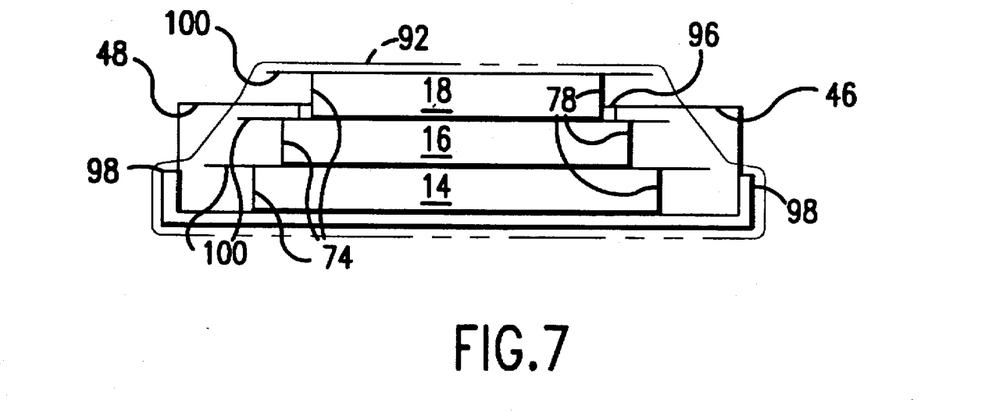
FIG. 7 shows a front view along arrow VII in FIG. 6, and in addition a diagrammatic cross-sectional view of the bag.

As shown in FIG. 6, the ground area of the fan housing 94 is rounded at its left and right end like a quarter circle so that the discharge and suction openings 48,46 (shown in FIG. 7) are directed toward the bag opening, i.e. downward in FIG. 6. As shown in FIG. 7, the discharge and suction openings 48,46 border with their inner edges on the front-wall 96 of the fan housing 94 on which the boxes 14–18 border with their backwalls 72. The bottom plate 90 is wider than the biggest box 14 lying undermost. Here, the width of the boxes is to be understood as the distance between their side-walls 74,78 that extend on the left and right in FIGS. 6 and 7 from the back- to the front-wall 72,76 of the boxes. As shown in FIG. 7, the side edges 98 of the bottom plate 90 that are in parallel with the sidewalls 74,78 are bent vertically up.

Figure 8:
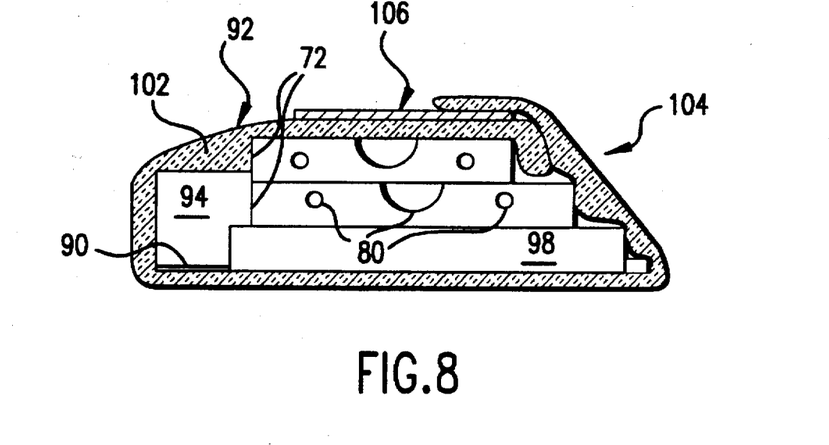
FIG. 8 shows a side view along arrow VIII in FIG. 6, and in addition a longitudinal section of the bag.
Figure 9:
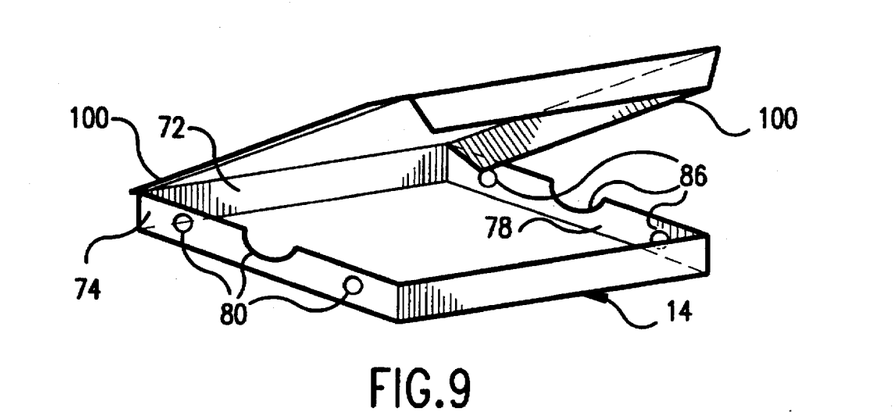
FIG. 9 shows a top perspective view of the pizza box of the third mode.

As shown in FIGS. 8 and 9, the sidewalls 74,78 have several holes 80,86. The holes in the left, as shown in FIGS. 6 and 9, sidewall 74 adjoining the discharge opening 48 of the hot-air fan, form inlet holes 80 for the hot air discharged by the hot-air fan, whereas the holes in the right, as shown in FIGS. 6 and 9, sidewall 78 adjoining the suction opening 46 of the hot-air fan, form inlet holes 80 for the air that comes from the boxes 14–18 and is sucked by the hot-air fan. Further, the cover 82 of each box 14–18 is provided at those two of its edges, which are in parallel with the punched sidewalls 74,78, with foldable wings 100. These wings 100 cover in a downward bent position, which is shown in FIG. 9 on the right side, the holes 80,86 in said punched sidewalls 74,78, whereas in a horizontally spread out position, which is shown in FIG. 9 on the left side, they lean on the upper rim of the punched sidewalls 74,78 to leave said holes 80,86 open.

In FIG. 7, the thick dotted line represents schematically the course of the bag 92 crosswise to the punched sidewalls 74,78. The material of the bag is flexible, such as a synthetic fiber fabric. Therefore, the bag conforms, by its own weight, to a large extend to the outer contour of the objects contained therein, i.e., the fan housing 94, the bottom plate 90, and the boxes 14–18. The dotted line shows a cross section running over the box stack, of the bag 92, which is held away from the holes 80,86 in the sidewalls 74,78 by means of the spread out wings 100 and the bent up side edges 98 of the bottom plate 90. By this, a distribution channel for the hot air discharged out of the discharge opening 48 is defined on the left side of the bag interior. Through this distribution channel, the hot air is guided to the inlet holes 80 in the left sidewalls 74 of the boxes 14–18. Accordingly, a collecting channel for the air leaving the outlet holes 86 in the right sidewalls 78 of the boxes 14–18 is defined on the right side of the bag interior. Through this collecting channel, the air is guided to the suction opening 46.

On the other side, the bag 92 fits closely on the cover of the uppermost box 18, as shown in FIG. 8. Here is also shown, how the bag 92 fills the steps in the outer contour of the box stack (see FIG. 8 on the right) and the step from the upper side of the fan housing 94 to the cover of the uppermost box 18 (see FIG. 8 on the left). To facilitate this, the material of the bag 92 preferably is of a double-layer structure and filled with an elastic-filling material 102 such as insulating wadding or insulating foamed material (see also FIG. 14). Since furthermore, the boxes 14–18 touch with their backwall 72 the front-wall 96 of the fan housing 94, the hot air is prevented from flowing past the exterior of the boxes instead of flowing through their interior.

As shown in FIG. 8, the bag 92 has an opening on its right side opposite the fan housing 94. The lower edge of this opening is continued by a closing piece 104 that is an homogeneous part of the bag 92, for closing the opening. A Velcro fastener 106 is attached to the upper side of the bag 92 so that the underside of the closing piece 104 is fixable in several position on the fastener 104. Depending on the number and size of boxes 14–18 contained in the bag 92, the closing piece 104 is pulled over the uppermost box 18 toward the fan housing 94, i.e. to the left in FIG. 8 as far as possible, and fixed on the upper side of the bag 92 by means of the Velcro fastener 106. By this, the boxes 14–18 are urged with their backwalls 72 against the front-wall 96 of the fan housing 94 by means of the closing piece 104. A lateral slipping of the boxes away from the center position shown in FIGS. 6 and 7 may prevented by the provision of (not shown) projections on the bottom plate 90 serving as stoppers for the lower side edges of the lowest box 14.

The drawing together of the bag 92 around the outer contour of fan housing 94 and box stack with the closing piece 104 that improves the above described filling of hollow spaces, may be assisted by a (not shown) clamping strap extending along a circumferential line that is running on the bag exterior, preferably on the upper side of the bag, between the discharge and suction openings 48,46 of the hot-air fan above the boxes 14–18.

Figure 10:
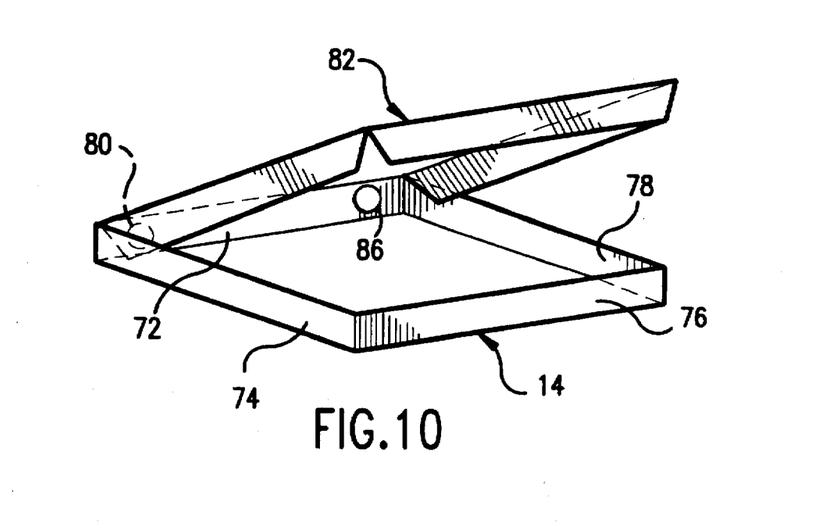
FIG. 10 shows a top perspective view of a pizza box of a fourth mode.
Figure 11:
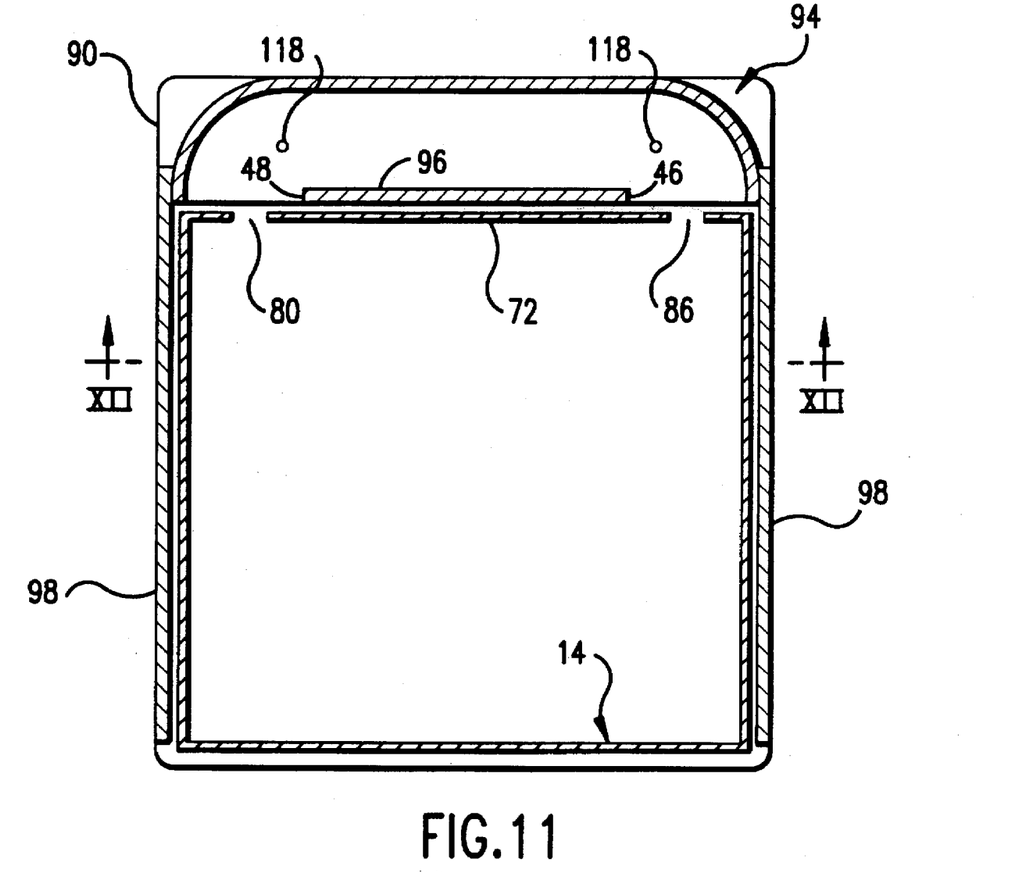
FIG. 11 shows a section along line XI—XI in FIG. 12 of the bottom plate and the hot-air fan corresponding to those of FIG. 6, but with pizza boxes of the fourth mode being put on the bottom plate.
Figure 12:
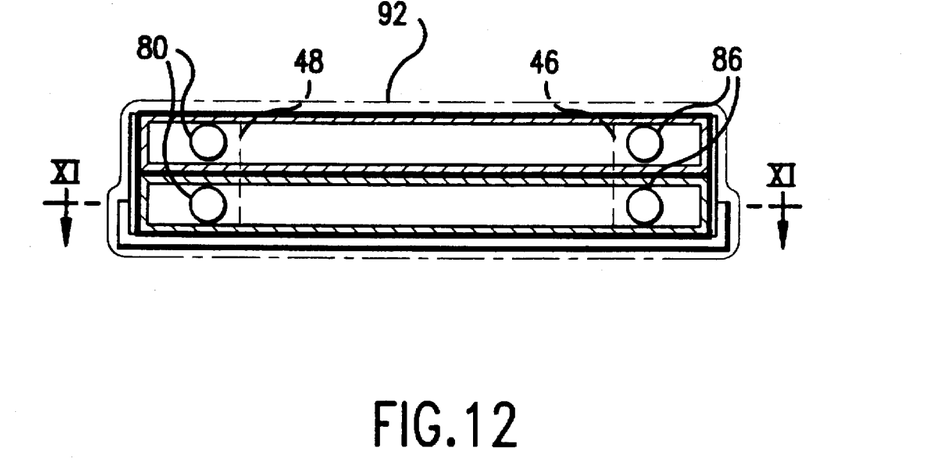
FIG. 12 shows a section along line XII—XII in FIG. 11, and in addition a diagrammatic cross-sectional view of the bag.

FIGS. 10 to 12 show a fourth embodiment of the pizza boxes 14. This box 14 has only one inlet hole 80 and one outlet hole 86 provided in its backwall 72. The term backwall 72 refers, as already in the above described third embodiment of the boxes 14, to that wall out of the four circumferential walls 72–78 which faces the front-wall 96 of the fan housing 94 if the box 14 is properly placed on the bottom plate 90. Therefore, it is, in contrast to the arrangement shown in FIG. 10, as well possible to provide the inlet and outlet holes 80,86 in a sidewall 74,78 or the front-wall 76. In this case, this punched sidewall 74,78,76 has to face the hot-air fan.

As shown in FIG. 11, the box 14 is so wide that the lateral outer border portions of the punched backwall 72 are located in front of the discharge and suction openings 48,46, respectively. The inlet and outlet holes 80,86 are arranged in these border portions so that the hot air may flow out of the hot-air fan directly, i.e., without any detour along a distribution or collecting channel as in the third embodiment of the boxes, to the inlet hole 80 in the box 14, and the out of the box 14 through the outlet hole 86 directly back to the hot-air fan.

Figure 13:
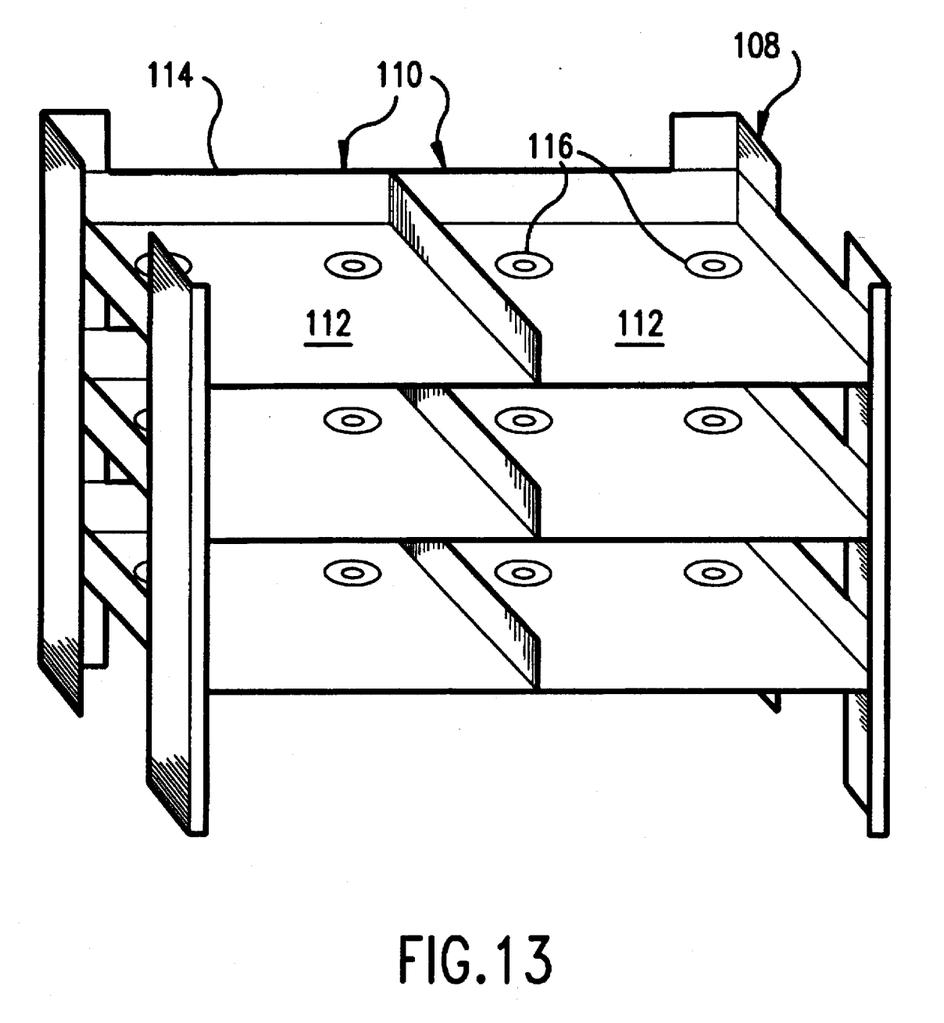
FIG. 13 shows a top perspective view of a frame with six shelves for holding warming apparatuses according to the second alternative.

FIG. 13 shows a support for warming apparatuses of the second alternative, in form of a frame 106 with three planes. Each plane has two shelves 110 for accomodating one bag 92 each. Each shelf 110 essential has the shape of a tub that is open at the front, and near its back-wall 114, two counter contacts 116 are let-in flush in its bottom 112. These counter contacts 116 build up the electric connection with the warming apparatus lying in the corresponding shelf 110, as will be described later in detail. The counter contacts 116 are connected to a electric power supply such as the public means supply of the battery of a motorcar.

The counter contacts 116 in the shelf bottom 112 co-operate with contacts 118 arranged correspondingly on the underside of the bag 92. As shown in FIG. 11, the contacts 18 are located inside the hot-air fan on the left and right.

Figure 14:
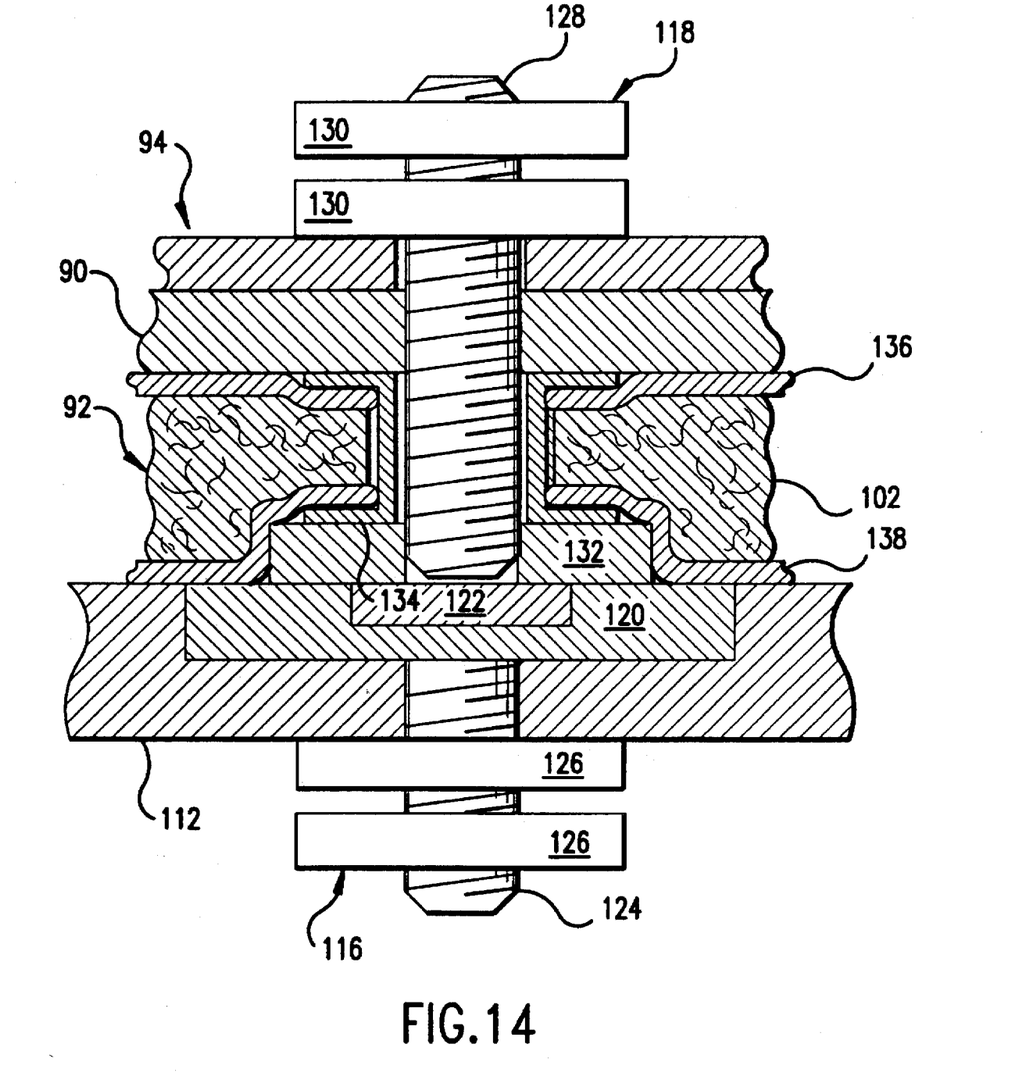
FIG. 14 shows an enlarged cross-sectional view of a pair of contact and counter contact, of a heated warming apparatus lying in a shelf of the frame of FIG. 13.

As shown in FIG. 14, showing an enlarged cross-sectional view of a pair of counter contact 116 of a shelf 110 and contact 118 of a warming apparatus lying in said shelf 110.

The counter contact 116 comprises a circular contact plate 120, preferably of brass, fitted flush in a blind hole provided in the shelf bottom 112, a permanent magnet 122 fitted flush and concentrically in said contact plate 120, a threaded bolt 124 projecting downward from the underside of the contact plate 120 through a bore in the shelf bottom 112, and two nuts 126 screwed on said bolt 124. The upper nut 126 serves to hold the contact plate 120 at the shelf bottom 112, whereas the lower nut 126 serves to squeeze a cable between the upper nut 126 and itself.

The contact 118 comprises a threaded bolt 128 that passes through a bore in the bottom of the fan housing 94 and meshes with a threaded bore in the bottom plate 90, two nuts 130 screwed on the top end of said threaded bolt 128, and a magnetizable contact disk 132, preferably of iron. The lower nut 130 serves to fix the fan housing 94 to the bottom plate 90, whereas the upper nut 130 serves to squeeze a cable leading to the electric components of the hot-air fan such as heater, rotor, thermostat, thermometer etc., between the lower nut 130 and itself. The contact disk 132 has a concentric threaded bore and is screwed on the lower end of the threaded bolt 128. Its circumferential surface is knurled so that it can be screwed on and off by hand.

The threaded bolt 128 passes from said bottom plate 90 through a hole in the bag bottom that is reinforced against tearing out by means of a rivet like sleeve 134. The sleeve 134 is shorter than the normal thickness of the bag bottom. By this, it presses together the filling material 102 lying between the inner and the outer layer 136,138 of the bag material, so far that the contact disk 132 can be screwed on the threaded bolt 128 until stopped at the sleeve 134, to fit approximately flush with the underside of the outer layer 138. Thus, the contact disk 132 squeezes tightly the bag bottom between the bottom plate 90 and itself. Consequently, the bottom plate 90 and the fan housing 94 attached thereon cannot slip inside the bag 92, but they can be taken out of the bag 92 after removing the contact disk 132. The threaded bolt 128 does not project downward out of the contact disk 132 so that the latter can closely contact the permanent magnet 122 and the contact plate 120.

The above described magnetic mounting of contact disk 132 and permanent magnet 122 assures a good electric connection between contact 118 and counter contact 116, because it prevents slippage of the bag 92 in the shelf 110 and presses the contact 118 and counter contact 116 against each other.

The aforedescribed embodiments of a heated warming apparatus for pizzas may of course be used without problems for other food products such as pasta dishes. In this case, it is possible to place a plate, preferably of cardboard or plastics material, holding the pasta or the other foods in the square boxes 14–20, instead of the pizza 22.

LIST OF REFERENCE NUMBERS

- 10 Housing
- 12 Warming room
- 14–20 Boxes
- 22 Pizza
- 24 Right wall of the housing
- 26 Door
- 28 Outer wall
- 30 Inner wall
- 32 Bottom of the housing
- 34 Drain channel
- 36 Connection opening
- 38 Outlet opening in the housing
- 40 Inlet opening in the housing
- 42 Base/Far
- 44 -none-
- 46 Suction opening of the fan
- 48 Discharge opening of the fan
- 50 Air channel
- 52 Rotor
- 54 Heater
- 56 By-pass
- 58 Dehumifdication chamber
- 60 Hatch
- 62 -none-

-continued
LIST OF REFERENCE NUMBERS

- 64 Net bag
- 66 -none-
- 68 Flap
- 70 Bottom of the box
- 72 Side-/Back-wall of the box
- 74 Left sidewall of the box
- 76 Side-/Front wall of the box
- 78 Right sidewall of the box
- 80 Inlet hole
- 82 Cover of the box
- 84 Lid of the cover
- 86 Outlet hole
- 88 -none-
- 90 Bottom plate
- 92 Bag
- 94 Fan housing
- 96 Front-wall of the fan housing
- 98 Side edge of the bottom plate
- 100 Wing
- 102 Filling material
- 104 Closing piece
- 106 Velcro fastener
- 108 Frame
- 110 Shelf
- 112 Shelf bottom
- 114 Back-wall of the shelf
- 116 Counter contact
- 118 Contact
- 120 Contact plate
- 122 Permanent magnet
- 124 Bolt of the counter contact
- 126 Nut of the counter contact
- 128 Bolt of the contact
- 130 Nut of the contact
- 132 Contact disk
- 134 Sleeve
- 136 Inner shell
- 138 Outer shell

We claim:

1. A heated warming apparatus for food products, comprising:
at least one food container for containing a food product;
a housing for accommodating the food container; and
a hot-air fan having a fan suction and a fan discharge, the hot-air fan supplying a hot air to the housing, wherein each food container has a least one inlet hole and at least one outlet hole for the hot air, the housing having a housing bottom with a housing inlet and a housing outlet for the hot air, the hot-air fan being mounted on an exterior of the housing such that the fan discharge covers the housing inlet, and, wherein the food containers are stackable, each food container having a bottom, a circumferential wall rising from the bottom, and a cover, at least one inlet hole of each food container being provided in the bottom, at least one outlet hole of each food container being provided in the cover, each food container being arranged in the housing such that at least one of the inlet holes of each food container is in fluid connection with the hot-air fan discharge, the arrangement being obtained by stacking food containers inside the housing such that at least one inlet hole of a lowest food container is aligned with the housing inlet, the food containers being further arranged such that a lower food container and an upper food container form a pair of food containers, that in each pair of food containers, at least one inlet hole of the upper food container is aligned with at least one outlet hole of the lower food container and such that at least one outlet hole of an uppermost food container is in fluid connection with the housing outlet.

2. The apparatus according to claim 1, wherein each food container comprises a single inlet hole and a single outlet hole, the inlet hole being provided between an edge of the food product contained in the food container and the circumferential wall, the outlet hole being staggered with respect to the corresponding inlet hole.

3. The apparatus according to claim 1, wherein in each pair of food containers stacked on each other, the upper food container forms the cover of the lower food container.

4. The apparatus according to claim 3, wherein an empty food container serves as the cover for the uppermost of the food containers containing the food product.

5. The apparatus according to claim 3, wherein each food container has a square ground area, the inlet hole being located in a corner of the square ground area.

6. The apparatus according to claim 5, wherein the outlet hole of each food container is located in a corner of the square ground area that is diametrically opposed to the corresponding inlet hole.

7. The apparatus according to claim 6, wherein two different markings are provided on an exterior of two opposite sides of the circumferential wall of each food container, respectively.

8. The apparatus according to claim 1, wherein the hot-air fan fits closely with the fan suction and the fan discharge.

9. The apparatus according to claim 8, wherein the hot-air fan further comprises:

an air channel with a rotor and a heater disposed one behind the other inside the air channel; and a dehumidification chamber provided upstream from the heater in a bypass of the air channel.

10. The apparatus according to claim 9, further comprising a flap for opening and closing the bypass.

11. The apparatus according to claim 9, wherein the hot-air fan is designed as a base on which the housing is placed removably.

12. The apparatus according to claim 11, wherein the base is mounted to a vehicle including one of a bicycle and a motorized two or three wheeler.

13. The apparatus according to claim 1, wherein the fan suction covers the housing outlet.

14. The apparatus according to claim 1, wherein the hot-air fan further comprises an electric heat coil.

15. A heated warming apparatus for food products, comprising:

at least one food container;

a housing for accommodating the food container; and a hot-air fan for supplying a hot air to the housing, wherein each food container comprises at least one inlet hole and at least one outlet hole for the hot air, the food container having a bottom, a circumferential wall and a cover, the housing being a bag made of a flexible material with a bag opening to be closed, the hot-air fan comprising a pie-shaped fan housing disposed inside the bag, a suction opening of the hot-air fan being connected to the bag, and wherein each food container is arranged inside the bag such that at least one inlet hole of each food container is in direct fluid connection with a hot-air fan discharge and at least one outlet hole of each food container is in direct fluid connection with a hot-air fan suction.

16. The apparatus according to claim 15, further comprising:

the bag opening laterally provided in the bag;

the hot-air fan disposed essentially horizontally inside the bag at an end opposed to the bag opening; and the food containers lying on top of each other such that a first portion of the circumferential wall of each food container is situated between the inlet and the outlet holes and a second portion of the circumferential wall of each food container extends from the hot-air fan suction to the hot-air fan discharge.

17. The apparatus according to claim 16, wherein a lower edge of the bag opening is continued by a closing piece that corresponds to a width of the bag opening and is fixable at several positions on an exterior of the bag.

18. The apparatus according to claim 15, wherein the hot-air fan is attached to a bottom plate covering a bag bottom.

19. The apparatus according to claim 18, wherein two side edges of the bottom plate extend from the hot-air fan and project upwards.

20. The apparatus according to claim 15, wherein the hot-air fan is removable from the bag.

21. The apparatus according to claim 15, wherein the hot-air fan suction and discharge are directed towards the bag opening.

22. The apparatus according to claim 15, wherein the material of the bag is impermeable to moisture.

23. The apparatus according to claim 15, wherein two contacts for an electrical power supply of the hot-air fan are attached to an underside of the fan housing and are fixable in two corresponding leadthroughs provided in the bag bottom.

24. The apparatus according to claim 23, further comprising a frame, the frame having at least one shelf for holding the bag, the shelf having a shelf bottom provided with two counter contacts that correspond to the contacts of the apparatus, the counter contacts being connected to an electric power source.

25. The apparatus according to claim 14, wherein the contacts and the counter contacts are arranged such that the contacts contain magnetic components and the counter contacts contain ferromagnetic components or the counter contacts contain magnetic components and the contacts contain ferromagnetic components or both the contacts and the counter contacts are magnetically polarized in an opposite direction.

26. The apparatus according to claim 24, wherein the frame is mounted in a motor vehicle and the counter contacts are connected with an electric power supply of the motor vehicle.

27. The apparatus according to claim 15, wherein the food container further comprises a ground area that is essentially square, the food container having at least one hole provided in each of two sidewalls adjacent to the first portion of the circumferential wall, and a width corresponding to a distance between the sidewalls, the distance being smaller than a width of the bag bottom measured in parallel to a line that connects the hot-air fan suction and discharge.

28. The apparatus according to claim 15, wherein the food container comprises a cover having foldable wings, edges of the foldable wings being parallel with the side walls, and wherein the wings, when folded downwardly, cover holes in the side walls, and when spread out horizontally, lean against an upper rim of the sidewalls so that the holes are left open.

29. The apparatus according to claim 15, wherein the food container further comprises a ground area that is essentially square, at least one hole provided in a lateral border portion of the first portion of the circumferential wall, the first portion of the circumferential wall being so wide that the lateral border portions overlap the hot-air fan suction and discharge.

* * * * *